United States Patent Office  3,338,672
Patented Aug. 29, 1967

3,338,672
METHOD FOR MAKING A FAUJASITE-TYPE CRYSTALLINE ZEOLITE
Walter L. Haden, Jr., Metuchen, and Frank J. Dzierzanowski, Somerset, N.J., assignors to Minerals & Chemicals Philipp Corporation, Woodbridge, N.J., a corporation of Maryland
No Drawing. Filed Feb. 25, 1964, Ser. No. 347,134
9 Claims. (Cl. 23—112)

ABSTRACT OF THE DISCLOSURE

A faujasite-type crystalline zeolitic molecular sieve is synthesized by reacting an aqueous sodium hydroxide solution with a mixture of amorphous dehydrated kaolin clays, the clays having been produced by calcining kaolin clays at different temperature levels. The reaction between the sodium hydroxide solution and the calcined clays is carried out under hydrothermal conditions while preventing dehydration of the reaction mixture.

---

This invention relates to synthetic zeolites and is especially directed to a process for synthesizing molecular sieves that are similar to the silicate mineral faujasite.

Faujasite is a rare aluminosilicate mineral which in its naturally occurring state contains calcium ions and sodium ions in base-exchangeable positions. Faujasite, or the base-exchanged forms of the mineral, possesses the unique ability to undergo dehydration with little if any change in the original cubic cell structure. When dehydrated, the mineral is interlaced with regularly spaced and uniformly sized pores. As a result, the dehydrated faujasite is valuable as an agent for selectively absorbing molecules from a mixture on the basis of differences in size between the molecules in the mixture. In other words, the dehydrated mineral is a so-called "molecular sieve." Dehydrated faujasite, especially an ion exchanged form of faujasite, is useful as an active ingredient in hydrocarbon cracking catalysts when embedded in suitable matrix material. However, like many other naturally-occurring zeolites, the quantity of faujasite that is available is wholly inadequate for commercial exploitation.

Crystalline molecular sieves, chemically different from faujasite but similar in structure, have been synthesized in the past. These zeolites have the approximate formula:

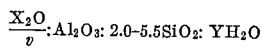

$$\frac{X_2O}{v}:Al_2O_3: 2.0\text{-}5.5SiO_2: YH_2O$$

wherein X represents a cation, e.g., a metal in groups I, II or III of the periodic table, transition metals, hydrogen, ammonium or mixtures thereof, $v$ is the valence of X, and Y is a variable depending on the value of $X/v$ and the ratio of $SiO_2/Al_2O_3$.

These zeolites, known as "type X" and "type Y" zeolites, are similar to each other in many respects, although type Y zeolite is somewhat richer in silica than type X. The X-ray powder diffraction of each of these zeolites, before and after dehydration, is characterized by the presence of a well defined peak at 6.2° $2\theta$ as well as other peaks characteristic of the mineral faujasite. This property readily distinguishes molecular sieves of the faujasite family from other zeolites, including zeolites having molecular sieve properties but possessing different dimensions and adsorption properties. A recommended procedure for distinguishing type X and type Y zeolites from each other is based upon an analysis of the X-ray diffraction line of the zeolite at about 31° $2\theta$. This procedure is described hereinafter.

Type X and type Y zeolites have been produced by precipitating finely divided crystals of the zeolite from a dilute aqueous mother liquor containing solubilized sources of sodium oxide, aluminum oxide and silica, e.g., a dilute aqueous solution of a mixture of sodium silicate and sodium aluminate or a dilute aqueous suspension of colloidal silica and sodium aluminate. As is the case with most crystallization processes in which crystals are precipitated from dilute reactants, prior art processes for precipitating synthetic faujasite entail the use of reactants of high purity. These reactants are expensive and the synthetic zeolite products are prohibitive in cost for most uses.

It has been suggested to produce solid aggregates of a molecular sieve by reaction in situ of certain preformed reaction masses, e.g., a mixture of a specific form of thermally dehydrated kaolin clay (metakaolin) and a concentrated sodium hydroxide solution. Attention is directed to the following U.S. patents, of which we are inventors: U.S. 3,094,383, U.S. 3,100,684, U.S. 3,065,054, U.S. 2,992,068. The molecular sieve that is formed by these processes is type A, a metallo-aluminum silicate that has an appreciably smaller effective pore diameter than faujasite-type molecular sieves and has a $SiO_2/Al_2O_3$ mol ratio of about 2/1.

We have conducted numerous experiments to adapt the procedures of the aforementioned patents to the direct synthesis of faujasite-type zeolites. These experiments have been carried out with reaction mixtures of the prior art including metakaolin and modified by the presence of additional quantities of silica to account for the fact that faujasite zeolites are usually richer in silica than type A zeolite. The results of attempts to adapt the procedures of these patents to the synthesis of faujasite-type molecular sieves have usually left much to be desired. Most of the experiments have led to the formation of masses of either heterogeneous crystalline phases, high purity type A zeolite, high purity type B zeolite or mixtures of the aforementioned with sodalite. Frequently no crystalline phases were obtained.

An object of this invention is the provision of a novel process for making zeolites from calcined clay.

Another object of this invention is the provision of a novel zeolite product.

This invention stems from the discovery that kaolin clay which has been thermally dehydrated substantially completely at a very high calcination temperature, whereby the clay undergoes the characteristic kaolinite exotherm after dehydration, is a useful reactant for synthesizing faujasite directly in massive form, especially when such dehydrated clay is used in combination with metakaolin (a form of dehydrated kaolin described hereinafter).

This invention, accordingly, is directed to a process for synthesizing faujasite from a mixture of dehydrated kaolin clays which have been calcined at different temperature levels, and an aqueous alkali metal hydroxide solution, especially an aqueous sodium hydroxide solution, by reaction of the solution with the mixture of dehydrated clays under hydrothermal conditions until synthetic faujasite forms. A feature of the process is that the reactants are subjected to hydrothermal treatment under conditions selected to prevent dehydration of the mass. A characteristic of the process is that synthetic faujasite is formed from a reaction mixture which, in absence of the clay dehydrated at very high temperature, would result in the formation of sodium zeolite A. In effect, the process of this invention brings about a reaction between metakaolin and alkali metal hydroxide solution in a manner such that synthetic faujasite is crystallized from the reactants, rather than type A zeolite. The product of this invention consists essentially of type X or type Y molecular sieve mixed with an amorphous aluminum silicate matrix derived from the high temperature calcined kaolin clay. A feature of this product is that it has noteworthy stability at high temperature in atmospheres including steam as a result of the presence of such matrix constituent.

By "metakaolin" we refer to a substantially anhydrous form of calcined kaolin clay which will undergo the strong exothermic reaction characteristic of kaolin clay when the calcined clay is heated to about 1800° F. for a suitable period of time. This form of deyhdrated kaolin clay is amorphous (as determined by X-ray diffraction). Method and apparatus for detecting the presence of this exotherm reaction are described by Ralph E. Grim in "Clay Mineralogy," page 203, published by McGraw-Hill Book Company, Inc. (1953). Metakaolin can be obtained by calcining kaolin clay in air at a product temperature within the range of about 1000° F. to about 1550° F., preferably with the range of about 1200° F. to about 1400° F., until the water of composition is below 1% by weight, preferably below ½%. When calcination temperature is appreciably less than 1200° F., calcination time may be undesirably long. On the other hand, when calcination is at temperatures appreciably greater than about 1500° F., local overheating may cause some of the kaolin to undergo the kaolin exotherm. As a result, it may be difficult to produce zeolites of predictable composition with such dehydrated kaolin clay. When the calcination equipment is provided with controls which will assure that the clay charge will not undergo the exotherm, metakaolin can be produced at calcination temperatures as high as 1800° F.

Our high temperature dehydrated kaolin clay is also an amorphous material and can be produced by calcining kaolin clay in air at product temperatures within the range of about 1600° F. to about 2000° F. for a sufficient time for the clay to undergo the exotherm after dehydration. When calcination temperature is approciably below 1700° F., some of the clay may not undergo the exotherm after dehydration. When calcination is at temperatures appreciably about 2000° F. undesirable cystallization of mullite and/or other crystalline material may take place. As in the case of metakaolin obtained at calcination temperatures close to the temperature at which the exotherm takes place, difficulty may be experienced in obtaining zeolites of predictable composition when the high temperature calcined kaolin clay contains crystalline phases resulting from the use of excessive heat in the calcination.

The products of this invention contain zeolite X or zeolite Y as the predominating zeolite species. Preferably they contain either one of the zeolites as the sole crystalline species and in substantial amount. As mentioned, they also contain an amorphous aluminum silicate matrix derived from the high temperature calcined kaolin.

Extensive crystallization is favored by proper control of reactants and reaction conditions, especially by heating the reaction mixture at a fairly low temperature for a substantial time before heating the reaction mixture to a temperature close to the boiling point and under pressure sufficient to prevent dehydration. We have been able to produce masses containing 75% synthetic crystalline faujasite (as estimated from intensity of diffraction maxima), the balance being amorphous matter. Since the species of faujasite (i.e., X or Y) that is crystallized from the reaction mixture is affected by a multiplicity of variables, no fixed rules for obtaining type X or type Y can be given.

In accordance with one form of our invention, the zeolite product is dehydrated and employed as a selective adsorbent for any of the known uses of the sodium form of zeolite X or zeolite Y. If desired, before dehydration, exchangeable sodium ions in the zeolite can be exchanged with suitable cations. When free sodium hydroxide is present in the product (as will be the case when the reaction mixture contains substantially in excess of 1 mol $Na_2O$ per mol metakaolin), the free alkali can be eliminated by washing the product with water before carrying out the ion-exchange reaction.

In accordance with another form of the invention, a mechanically strong contact mass, especially a hydrocarbon cracking catalyst, is obtained by mixing the pulverized zeolite reaction product with a major weight proportion of plastic clay, especially uncalcined kaolin clay and with water sufficient to form a plastic mixture. The aqueous mixture of clay and pulverized zeolite containing free alkali is formed into particles of the desired size and shape, such as by extrusion into pellets. These particles are reacted and, in the case of a cracking catalyst, ion-exchanged with a nonalkali metal salt, such as for example a salt of calcium, cerium, ammonium or mixtures thereof. The exchanged particles are then activated by calcination at 1000° to 1500° F. and optionally given a steam treatment to stabilize the activity.

FORMATION OF REACTION MIXTURE

In carrying out the present invention, we form a mixture containing 1 mol metakaolin (kaolin clay previously dehydrated by calcination at a temperature below that at which the characteristic kaolin exotherm takes place) with from ¼ to 7 mols of dehydrated kaolin clay calcined at a temperature above that at which the characteristic kaolin exotherm takes place. Also present in our reaction mixture is an aqueous solution of alkali metal hydroxide in amount at least sufficient to wet said mixture thoroughly. As mentioned, our preferred alkali metal hydroxide is sodium hydroxide although the use of potassium hydroxide, lithium hydroxide or mixtures thereof with sodium hydroxide is contemplated. Using our preferred sodium hydroxide, we employ a solution having a concentration sufficient to provide at least 1 mol $Na_2O$, and preferably 2 to 4 mols $Na_2O$, per mol of said metakaolin. The presence of $Na_2O$ substantially in excess of 1 mol per mol metakaolin, taken with the use of relative large amounts of high temperature dehydrated kaolin as compared with low temperature dehydrated kaolin, assures the crystallization of faujasite zeolites and minimizes crystallization of other zeolites, as may occur when we employ only 1 mol $Na_2O$ per mol metakaolin. Sodium hydroxide solutions of about 5% to 45% NaOH concentration (weight basis) are within the scope of this invention. Solutions of about 10% to 25% NaOH concentration are recommended when employing large quantities of high temperature calcined clay (e.g., 3 to 6 mols per mol metakaolin are used). At NaOH concentrations appreciably below 10%, the reactants may fail to crystallize to the desired extent. At NaOH concentrations approciably above 45%, the quantity of solution may be insufficient to wet the solids and, therefore, unreacted calcined clay can be expected to be present as a contaminant in the product.

Our dehydrated kaolin clays are preferably obtained from kaolin clays having a $SiO_2/Al_2O_3$ mol ratio as close to the theoretical value of 2.00 as is possible. However, the dehydrated clays may be obtained from kaolin clays having somewhat higher or lower $SiO_2/Al_2O_3$ mol ratios, e.g., 2.00±.05; in this case the zeolite may be somewhat less pure than when the mol ratio of $SiO_2$ to $Al_2O_3$ in the starting kaolin clay is 2.00 to 1. Kaolin clays are frequently associated with foreign materials such as quartz, and the removal of such materials from the kaolin facilitates the ultimate formation of the high purity faujasite type zeolite, especially when such impurities are present in substantial amount. Hence, we prefer to use calcined kaolin clays obtained from kaolin clay which has been treated for removal of grit and foreign bodies, as well as clots of undispersed kaolin clay. Our calcined clays should contain not more than about 0.75 percent of combined water (water of hydration). The starting dehydrated clay should be finely divided, i.e., all of the material should be minus 200 mesh.

The reaction masses can contain other ingredients in addition to a mixture of calcined kaolin clays and alkali solution. For example, the reaction masses can contain uncalcined (fully hydrated) kaolin clay in amount that is at least equal (on a volatile free weight basis) to the combined weight of the calcined clays. Volatile free weight is determined by heating a material to constant weight at 1800° F. The quantity of sodium hydroxide solution used in this case must be sufficient to provide from 0.05 to 0.80 mol $Na_2O$ per mol of the hydrated kaolin clay in addition to providing 1 mol $Na_2O$ per mol of metakaolin in the mixture. When these ingredients are used, the mixture can be formed into particles which are very hard after reaction is completed.

To facilitate the formation of a uniform mixture of our calcined clays with alkali solution we prefer to dry blend our calcined clays until a uniform mixture is obtained. Without heating, we incorporate a solution of sodium hydroxide into the mixture of dehydrated clays. Apparatus suitable for the mixing will depend, among other things, on the relative proportion of liquid to solids in the mixture. This proportion will vary with the concentration of the alkali solution and with the ratios of $Na_2O$ and high temperature calcined clay to metakaolin in the reaction mixture.

The consistency of the reaction mixture, for any given $Na_2O$/metakaolin ratio and NaOH concentration, will vary with the quantity of high temperature calcined clay present. Typically, the mixture has the consistency of a thick slurry. The mixtures can be placed in forms, such as pans, before reaction. As a result of reaction, the mixture hardens into a block which can be crushed and sized to provide granules of the desired size.

Microspheres may be produced by initially forming a very dilute mixture of our mixtures of calcined clay and alkali solution and spray drying such mixture into an evaporative media to produce coherent microspheres consisting of a mixture of calcined clays and alkali of 10% to 45% concentration. The microspheres are then reacted at elevated temperature to form the molecular sieve, as described hereinafter.

REACTION AND CRYSTALLIZATION

To convert the mixture of calcined clays with alkali solution into a molecular sieve, the mixture is heated while it is out of direct contact with an external aqueous phase which would leach alkali from the mixture and while the mass is under sufficient vapor pressure to prevent dehydration. Thus, the vapor pressure exerted on the reactants must be equal to the vapor pressure of the reactants until molecular sieve formation is completed. Crystallization is favored by maintaining the mass at a temperature well below the boiling point for several hours before the zeolite is subsequently crystallized at a temperature close to the boiling point and under pressure sufficient to prevent dehydration of the mass. It is recommended to maintain (age) the mass at a product temperature with the range of about 70° F. to about 120° F. for at least 2 hours, preferably for 4 to 24 hours, and then heat the mass to a product temperature ranging from about 150° F. to about 212° F. for at least 12 hours, preferably 24 to 36 hours, or until substantially no more faujasite can be crystallized from the mass. While good results can be realized with some reaction masses that have been heated to crystallization temperature without an aging step, the product will generally be more crystalline when aging the mass at lower temperature before carrying out the high temperature crystallization. The masses can be reacted in an inert environment, such as oil or air.

Pursuant to an embodiment of our invention, the masses are reacted by immersing them in an organic liquid which is heated in an enclosed vessel to a temperature such that the temperature of the reaction mass does not exceed the desired temperature. The organic liquid we employ may be any one which is immiscible with and unreactive with the alkali solution present within the mass, and which is characterized further by having a boiling point in excess of the maximum temperature to be reached by the masses during their reaction. The organic liquid may be a hydrocarbon such as mineral oil. If desired, a halogenated hydrocarbon which is not hydrolyzed by the alkali or other organic liquids can be used. Preferably, such organic liquid has a relatively low distillation end point, such as 550° F. or less, so that it can be readily removed from the product by distillation after the product is crystallized. Another suitable method for aging the reaction masses involves immersing the masses directly in an immiscible light petroleum cut, such as petroleum ether, which boils at a temperature below the maximum temperature to which it is desired to subject the masses. In this way, reaction temperature is controlled by the boiling point of the organic liquid.

An important advantage of employing oil as the reaction medium is that carbon dioxide from the atmosphere is excluded from the reactants so that reaction between any free alkali and carbon dioxide is precluded.

Although the masses are preferably reacted in an environment of organic liquid or air under conditions to control the mass temperature during the reaction, other mediums should be feasible provided they are capable of controlling the mass temperature.

No agitation of the reaction masses is required during reaction and agitation strong enough to disintegrate or break up the masses may be undesirable.

To determined the minimum time required for the completion of the reaction under the particular operating conditions employed, samples of the reaction product may be taken after various reaction intervals. Aging should be prolonged until the product produces intense X-ray diffraction maxima characteristic of the desired zeolite when a well-crystallized sieve is desired.

ACTIVATION OF THE ZEOLITE

The zeolite may be dehydrated substantially completely to form a molecular sieve by calcination at a temperature within the range of from about 220° F. to about 1200° F. or somewhat higher, and usually between about 400° F. to about 700° F. The calcination time will depend on calcination temperature and atmosphere. Partial dehydration may be suitable or desirable for some uses of the sieve.

To provide other forms of synthetic faujasite, the hydrated sodium zeolite may be base-exchanged with other monovalent cations, such as ammonium, hydrogen, potassium and lithium; group II metal ions such as magnesium, calcium and strontium; group III metal ions such as aluminum; ions of transition metals such as nickel, titanium, chromium, iron, manganese, tungsten, as well as others whose atomic numbers are from 21–28, inclusive, 39–46, inclusive, and 72–78, inclusive. Other ions, such as cerium and copper, can be used. The base-exchange step is conveniently accomplished by soaking, percolating or otherwise contacting the zeolite with a dilute aqueous solution of soluble salt of the above-mentioned ions (or other exchangeable ions) until the desired degree of ion-exchange has taken place.

The following examples are given for illustrative purposes.

All X-ray diffraction data referred to in these examples was obtained from random powder patterns using the K-alpha doublet of copper as the source of X-radiation, a receiving slit width of 0.006" a Norelco specimen holder having a sample area of 0.812" x 0.408", a 3° take-off angle, a scintillation counter, a scanning rate of 2° per minute, a time constant of 4 seconds, a scanning direction increasing from 2° to 90°, and a strip chart pen recorder. Specimens were equilibrated at 25° C. and 40% to 50% relative humidity for at least 18 hours prior to X-raying. Peak heights (counts per second, or "c./s.") and positions were recorded on a strip chart.

In view of the similarity between the diffraction patterns of the X and Y zeolites, each of which has a characteristic maximum at 6.2° 2θ, X zeolite was distinguished from Y zeolite by applying to X-ray power diffraction patterns of products the criterion set forth in Table III of a publication by Donald C. Freeman, Jr., entitled "Electrical Conductivity of Synthetic Crystalline Zeolites," Journal of Chemical Physics, vol. 35, No. 3, September 1961. Table III in said publication correlates unit cell dimension with $SiO_2/Al_2O_3$ ratio. To make a determination as to zeolite identity, the peak located at about 31° 2θ on the powder diffraction pattern of a sample is observed. If such peak is located below 31.12° 2θ, corresponding to a $SiO_2/Al_2O_3$ ratio of 3.00 as shown in Table III of the publication, the zeolite is identified as X. If the peak at about 31° 2θ is located at or above 31.13° 2θ, the zeolite is identified as Y.

In estimating percent crystalline zeolite of products, a commercial sample of type 13X zeolite was used as a reference. This sample, assumed to contain 100% zeolite, had a 6.2° 2θ peak of 880 c./s. Percent sieve in samples was estimated by observing the intensity of the 6.2° 2θ peak in c./s. and multiplying such value by the factor of 100/880.

The following commercial calcined kaolin clays were used in the preparations described in the examples.

| Physical Characteristics | Satintone #1 | Satintone #2 |
| --- | --- | --- |
| Specific Gravity | 2.63 | 2.50 |
| Moisture, maximum percent | 1.0 | 1.0 |
| Wet Screen Residue, percent plus 325 mesh | 0.5 | 0.5 |
| Average Particle Size, microns | 2.0 | 4.5 |
| pH | 5.8–6.3 | 5.8–6.3 |
| Typical Chemical Analysis (Moisture-free, wt. basis): | | |
| Ignition Loss at 1800° F., percent | 0.5 | 0.9 |
| Silica, percent | 52.3 | 52.1 |
| Alumina, percent | 44.6 | 44.4 |
| Iron Oxide, percent | Trace | Trace |
| Titanium Dioxide | 2.0 | 2.0 |
| Alkali Metal Oxide | None | None |
| Calcination Treatment | (1) | (2) |
| Composition | (3) | (4) |

1 Calcined above exotherm.
2 Calcined below exotherm.
3 Amorphous (possibly incipient mullite).
4 Amorphous (metakaolin).

*Example I*

A product estimated to contain about 75% sodium zeolite Y as the sole crystalline constituent was obtained from a mixture of commercial calcined kaolin clays and sodium hydroxide solution as follows.

333.0 grams of Satintone #2 was thoroughly dry blended with 999.0 grams Satintone #1 in a container on an automatic roller arrangement. The mixture of calcined clays was gradually added to 1200 ml. of a 20% NaOH solution (20 parts NaOH to 80 parts by weight of water) in a stainless steel beaker. The alkali solution was at room temperature before addition of the clay to the mixture. During the addition of clays to the solution, the solution was continuously agitated. The total time for adding the clays and sodium hydroxide solution was 23 minutes. After addition of all of the clay was completed, the ingredients were spatula blended for 5 minutes, producing a thick slurry.

The slurry was poured into a glass container, filling less than half of the container. The container was tightly sealed and maintained at room temperature for 4 hours. The container with contents was then placed in a 200° F. oven and held in the over for 48 hours. The product was a friable solid mass.

A sample of the product was studied by X-ray. An X-ray diffraction pattern showed that a material having a 6.2° 2θ peak height of 640 c./s. was the only crystalline material present. From the fact that the 6.2° 2θ peak height of a commercial synthetic faujasite (type X) was 880 c./s., it was estimated that the reaction product contained about 75% synthetic faujasite as the sole crystalline material.

To determine the thermal stability of the product, a sample of the zeolite product was activated by calcination in a 1050° F. muffle furnace for 30 minutes. The 6.2° 2θ peak height of this product was 588 c./s., indicating that only about 13 percent of the crystal structure was lost during the high temperature calcination. From the intensity of the 31.0° 2θ peak on the X-ray pattern of the calcined material it was estimated that the zeolite product had a $SiO_2/Al_2O_3$ mol ratio of 3.43/1, indicating that type Y molecular sieve was present.

*Example II*

Still in accordance with this invention, 55.5 grams of Satintone #1 were thoroughly blended with 166.5 grams of Satintone #2. To the mixture 400 ml. of a 20% NaOH solution was added in 100 ml. portions, with mixing after each addition. The mixture was poured into a container and the container was covered. The mixture was thoroughly mixed for 5 minutes by a propeller mixer passing through the lid of the container. The resulting slurry was then poured into jars, with the slurry only partially filling the jars. The jars were sealed and maintained at room temperature for 25 hours and then in the 200° F. oven for 90 hours.

X-rays were obtained of the reacted sample before and after calcining at 1050° F. The X-rays of the uncalcined material indicated that the only crystalline material present was sodium zeolite X having a $SiO_2/Al_2O_3$ ratio of 2.49. A comparison of the 6.2° 2θ peak intensity of the product with that of the commercial standard indicated that the composition contained 30% sodium zeolite X.

*Example III*

The procedure of Example II was repeated with a 10% solution of NaOH. The reaction mixture contained 27.75 grams Satintone #2, 83.25 grams Satintone #1, and 400 ml. of a 10% NaOH solution. In this case the mixture was aged in sealed glass jars for 24 hours before the sealed jars were placed in a 200° F. oven and held there for 24 hours.

X-ray studies indicated that the only crystalline material present in the product before and after calcination at 1050° F. for ½ hour was sodium zeolite Y ($SiO_2/Al_2O_3$ mol ratio of 3.37). From the fact that the 6.2° 2θ peak height of the uncalcined product was 288 c./s., it was estimated that the product contained about ⅓ sodium zeolite Y.

A comparison of results in Example III with results in Example II indicate that with compositions containing 4 mols $Na_2O$ per mol metakaolin, and the same reaction conditions, type Y formation is facilitated by employing a dilute source of $Na_2O$ whereas type X formation is promoted by use of more concentrated sources of $Na_2O$. The data also indicate that the silica-to-alumina ratio of the zeolite tends to increase with increasing ratio of high temperature calcined clay to metakaolin.

*Example IV*

Still in accordance with this invention, a product estimated to contain about 65% by weight of crystalline type Y zeolite was obtained as follows:

27.75 grams of Satintone #1 was thoroughly mixed with 166.5 grams Satintone #2. 200 ml. of a 20% solution of NaOH was slowly added at room temperature to the mixture of calcined clays in a stainless steel container. The ingredients were stirred and whipped for about 10 minutes by agitation with a Lightnin' Mixer. The moist solid mixture was aged at room temperature for 24 hours and reacted at 200° F. for 24 hours in sealed jars, as in the previous example.

Example V

Still in accordance with this invention, faujasite was synthesized from a mixture of calcined kaolin clays as follows.

One portion of a sample of high purity water-washed Georgia kaolin clay was calcined in a muffle furnace maintained at 1500° F. for 17 hours. Another sample of the same kaolin clay was calcined in a muffle furnace maintained at 1700° F. for 17 hours. After the calcined clays had cooled to room temperature, they were mixed using equal weight proportions of the two calcined clays. To the mixture, a 20% aqueous solution of NaOH was added using 180 parts by weight of solution to 100 parts by weight of the mixture of calcined clays. The mixture was placed in a glass jar which was tightly sealed. The jar was allowed to stand at room temperature (about 75° F.) for about 18 hours. The product was then placed in a glass jar containing 1 ml. of water for each 10 grams of product. The jar was tightly sealed and placed in an oven maintained at 225° F. The jar with contents was maintained in the oven at 225° F. for 6 hours.

An X-ray diffraction pattern of the product indicated that sodium zeolite X was the only crystalline material present.

We claim:

1. A method for synthesizing a crystalline faujasite-type zeolite the X-ray diffraction pattern of which has a maximum peak at 6.2° $2\theta$, said method comprising: forming a mixture comprising (a) metakaolin, (b) amorphous dehydrated kaolin clay which has been obtained by calcining kaolin clay at a temperature and for a time such that the characteristic kaolin exotherm has taken place after dehydration, and (c) an aqueous solution of sodium hydroxide of 5% to 45% concentration, said dehydrated clay (b) being employed in amount within the range of ¼ to 7 mols per mol of said metakaolin (a) and said sodium hydroxide solution being employed in amount at least sufficient to wet thoroughly said clays (a) and (b), aging the mixture at a temperature within the range of about 70° F. to about 120° F. for at least 2 hours and, while maintaining said mixture under pressure sufficient to prevent dehydration, heating to a product temperature within the range of about 150° F. to about 212° F. until there is formed a crystalline material the X-ray diffraction pattern of which has a maximum peak at 6.2° $2\theta$.

2. The method of claim 1 wherein the concentration of said sodium hydroxide solution is within the range of 10% and 25%.

3. The method of claim 1 wherein the concentration of said sodium hydroxide solution is within the range of 10% to 25% and said dehydrated clay (b) is employed in amount within the range of 3 to 6 mols per mol of metakaolin (a).

4. The method of claim 3 wherein said quantity of sodium hydroxide is such as to form a thick slurry with said metakaolin (a) and said dehydrated clay (b), and said crystalline material is formed as a coherent mass.

5. The method of claim 1 wherein said crystalline material is further characterized by having an X-ray diffraction peak at about 31° $2\theta$, said peak being located below 31.12° $2\theta$.

6. The method of claim 1 wherein said crystalline material is further characterized by having an X-ray diffraction peak at about 31° $2\theta$, said peak being located at or above 31.13° $2\theta$.

7. The method of claim 1 wherein said crystalline material has substantially the X-ray diffraction pattern of sodium zeolite X.

8. The method of claim 3 wherein said crystalline material has substantially the X-ray diffraction pattern of sodium zeolite Y.

9. The method of claim 1 wherein said sodium hydroxide is employed in amount to provide at least 1 mol $Na_2O$ per mol metakaolin.

References Cited

UNITED STATES PATENTS

| | | | |
|---|---|---|---|
| 2,992,068 | 7/1961 | Haden et al. | 23—112 |
| 3,119,659 | 1/1964 | Taggart et al. | 23—112 |

OSCAR R. VERTIZ, *Primary Examiner.*

EDWARD J. MEROS, *Examiner.*